(12) United States Patent
Luong et al.

(10) Patent No.: US 9,060,001 B2
(45) Date of Patent: Jun. 16, 2015

(54) PREFIX AND PREDICTIVE SEARCH IN A DISTRIBUTED HASH TABLE

(75) Inventors: Steven Vincent Luong, San Jose, CA (US); Manish Bhardwaj, San Jose, CA (US); Jiang Zhu, Sunnyvale, CA (US); Huida Dai, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 317 days.

(21) Appl. No.: 13/281,125

(22) Filed: Oct. 25, 2011

(65) Prior Publication Data

US 2013/0103694 A1 Apr. 25, 2013

(51) Int. Cl.
*G06F 7/00* (2006.01)
*G06F 17/30* (2006.01)
*H04L 29/08* (2006.01)

(52) U.S. Cl.
CPC ........ *H04L 67/1065* (2013.01); *G06F 17/3033* (2013.01)

(58) Field of Classification Search
CPC .................................................. G06F 17/3303
USPC ....................................................... 707/795
See application file for complete search history.

(56) References Cited

U.S. PATENT DOCUMENTS

| | | |
|---|---|---|
| 7,304,994 B2 | 12/2007 | Dubmicki et al. |
| 7,478,120 B1 | 1/2009 | Zhang |
| 2005/0135381 A1* | 6/2005 | Dubnicki et al. ........ 370/395.32 |
| 2007/0174309 A1* | 7/2007 | Pettovello ...................... 707/100 |
| 2010/0146003 A1* | 6/2010 | Bruso et al. ..................... 707/797 |

OTHER PUBLICATIONS

Juong et al., "KISS: A Simple Prefix Search Scheme in P2P Networks", [online], [retrieved on Apr. 12, 2011]. Retrieved from the Internet: <URL: http://db.ucsd.edu/webdb2006/camera-ready/paginated/11-149.pdf>, pp. 56-61.

Ramabhadran et al., "Prefix Hash Tree: an Indexing Data Structure over Distributed Hash Tables", XP-002467877, [online], Feb. 2004, [retrieved on Feb. 5, 2008]. Retrieved from the Internet: <URL: http://berkeley.intel-research.net/sylvia/pht.pdf>, 10 pages.

* cited by examiner

*Primary Examiner* — Hosain Alam
*Assistant Examiner* — Van Oberly
(74) *Attorney, Agent, or Firm* — Leon R. Turkevich (57) ABSTRACT

In one embodiment, a method comprises identifying prefix groups for searchable character symbols, each prefix group having a corresponding searchable character symbol comprising at least one searchable character; assigning at least one prefix group to each of a plurality of distributed hash table nodes in a network, each distributed hash table node containing at least one of the prefix groups, each distributed hash table node assigned a corresponding prescribed keyspace range of a prescribed keyspace, each distributed hash table node configured for storing data records having respective primary data record keys within the corresponding prescribed keyspace range; and assigning secondary indexes that start with one of the searchable character symbols to the corresponding prefix group in the associated distributed hash table node, enabling any prefix search starting with the one searchable character symbol to be directed to the corresponding prefix group in the associated distributed hash table node.

20 Claims, 5 Drawing Sheets

| Searchable Character Symbol, 16 | Prefix Group, 14 | DHT Node, 24 |
|---|---|---|
| a | M-a | N0 |
| b | M-b | N1 |
| c | M-c | N2 |
| d | M-d | N3 |
| e | M-e | N4 |
| f | M-f | N5 |
| g | M-g | N6 |
| h | M-h | N7 |
| i | M-i | N0 |
| ⋮ | ⋮ | ⋮ |
| r | M-r | N1 |
| s — 62a | M-s | N2 |
| ta - tn — | M-t1 ← 14' | N3 |
| to - tz — 62b | M-t2 ← | N8 |
| u | M-u | N4 |
| v | M-v | N5 |
| ⋮ | ⋮ | ⋮ |
| 7 | M-7 | N1 |
| 8 | M-8 | N2 |
| 9 | M-9 | N3 |

Prefix Map Table, 56

PREFIX AND PREDICTIVE SEARCH IN A DISTRIBUTED HASH TABLE

TECHNICAL FIELD

The present disclosure generally relates to implementing prefix searching in a peer-to-peer network, for example an Internet Protocol (IP) based network implementing a distributed hash table.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

Prefix and predictive search techniques have been widely studied in information systems and information retrieval systems, however most techniques for prefix and predictive searching have focused on retrieving data from a centralized database. Distributed hash tables (DHTs) are used to provide a random distribution of stored data objects in storage nodes: the distributed hash tables establish a distributed database in the storage nodes based on generating a hash key for a prescribed attribute of the data object, for example a title of the data object. The distributed hash tables, however, introduce new problems for attempting prefix and predictive search techniques in a distributed database.

For example, the requirements of numerous search keys for a single data object requires multiple queries to be generated to different nodes within the distributed hash table.

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

In one embodiment, a method comprises identifying a plurality of prefix groups for respective searchable character symbols, each prefix group having a corresponding searchable character symbol comprising at least one searchable character; assigning at least one of the prefix groups to each of a plurality of distributed hash table nodes in a network, each distributed hash table node containing at least one of the prefix groups, each distributed hash table node assigned a corresponding prescribed keyspace range of a prescribed keyspace, each distributed hash table node configured for storing data records having respective primary data record keys within the corresponding prescribed keyspace range; and assigning secondary indexes that start with one of the searchable character symbols to the corresponding prefix group in the associated distributed hash table node, enabling any prefix search starting with the one searchable character symbol to be directed to the corresponding prefix group in the associated distributed hash table node.

In another embodiment, an apparatus comprises a first circuit and a processor circuit. The first circuit is configured for identifying a plurality of prefix groups for respective searchable character symbols, each prefix group having a corresponding searchable character symbol comprising at least one searchable character. The processor circuit is configured for assigning at least one of the prefix groups to each of a plurality of distributed hash table nodes in a network, each distributed hash table node containing at least one of the prefix groups, each distributed hash table node assigned a corresponding prescribed keyspace range of a prescribed keyspace, each distributed hash table node configured for storing data records having respective primary data record keys within the corresponding prescribed keyspace range. The processor circuit further is configured for assigning secondary indexes that start with one of the searchable character symbols to the corresponding prefix group in the associated distributed hash table node, enabling any prefix search starting with the one searchable character symbol to be directed to the corresponding prefix group in the associated distributed hash table node.

DETAILED DESCRIPTION

Particular embodiments enable an efficient deployment of prefix search in a distributed hash table (DHT) storage system in a distributed network. The particular embodiments enable a prefix search to be implemented within the DHT storage system in an efficient manner, based on sending all query strings that start with the same searchable character symbol to the same prefix group within an identified one of the distributed hash table nodes of the distributed network.

In particular, prefix groups are identified for assignment of respective searchable character symbols, such that each prefix group has a corresponding searchable character symbol. The term "assignment" as used in this specification and the attached claims refers to at least a temporary association or mapping between two entities (e.g., at least a temporary association/mapping between a prefix group and a distributed hash table) that can be executed dynamically in response to a detected condition, described below; hence, the term "assignment" does not require or imply a static assignment that is fixed and unchangeable. Each searchable character symbol comprises at least one searchable character. An example searchable character is an alphanumeric character, for example one of the twenty-six (26) letters "A" through "Z" of the English alphabet, or one of the ten numeric digits "0" through "9"; other unicode characters can be utilized for multilingual searches. Hence, a searchable character symbol can be defined to consist of only one searchable character (e.g., "t"); alternately the searchable character symbol can be defined include two or more searchable characters (e.g., "ta"), for example to partition search keys into multiple prefix groups such that the searchable character symbol "ta" is assigned to one prefix group, and the searchable character symbol "to" is assigned to another prefix group.

Each prefix group is assigned (e.g., dynamically mapped) to one and only one distributed hash table node within the distributed network: each distributed hash table node is assigned a corresponding prescribed keyspace range of a prescribed keyspace, for storage of data records having primary data record keys within the corresponding prescribed keyspace range. Hence, each distributed hash table node that stores data records within the corresponding prescribed keyspace range also can store zero or more prefix groups for a searchable character symbol, for example including all secondary indexes that start with the corresponding searchable character symbol. Hence, all prefix searches that start with a particular searchable character symbol can be directed to the same corresponding prefix group within the associated distributed hash table node, optimizing search efficiency within the distributed hash table storage system.

Figure 1:
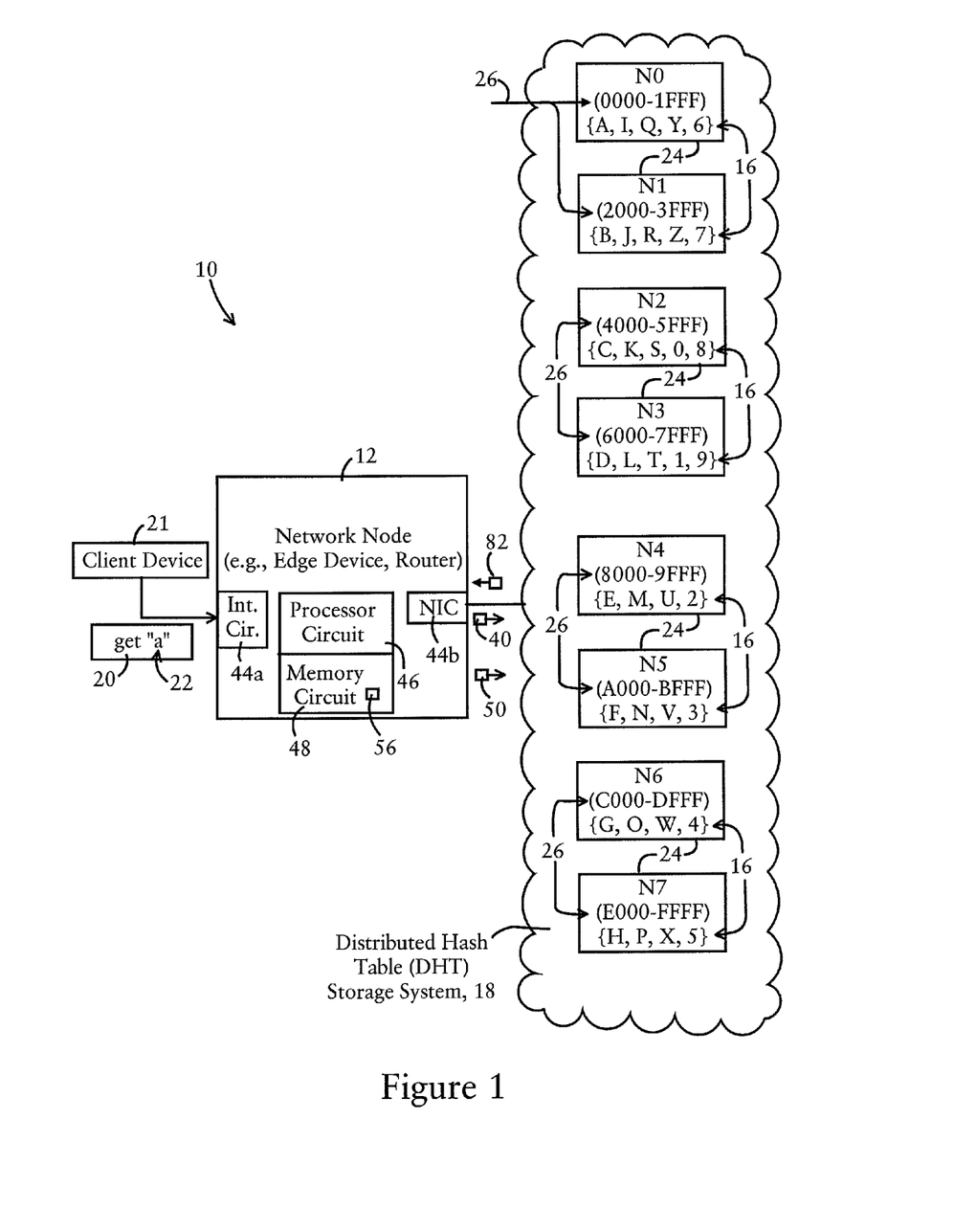
FIG. 1 illustrates an example system having an apparatus for executing prefix searches using prefix groups for respective searchable character symbols within a network-based distributed hash table storage system comprising distributed hash table nodes, according to an example embodiment.

FIG. 1 illustrates an example system 10 having an apparatus 12 for executing prefix searches using prefix groups (14 of FIG. 2) for respective searchable character symbols 16 within a network-based distributed hash table storage system 18, according to an example embodiment. The apparatus 12 is a physical machine (i.e., a hardware device) configured for implementing network communications with other physical machines in the system 10. The apparatus 12 can be implemented in the form of a network edge device in a service provider network, an edge device (e.g., gateway) to the network-based distributed hash table storage system 18, an Internet protocol based router, a network appliance, and/or a computer.

The apparatus 12 illustrated in FIG. 1 includes at least one interface circuit 44, a processor circuit 46, and a memory circuit 48. The apparatus 12 can include a client device interface circuit 44a configured for receiving queries 20 from the client device 21 and returning query results, and a network interface circuit 44b configured for sending and receiving information to and from an Internet Protocol (IP) network-based DHT storage system 18, for example outputting the request 40 and 50, and receiving results 82 from the DHT storage system 18. The memory circuit 48 can be configured for storing a cache of prefix search results received in response to the prefix search request 40.

The client device 21 can be either distinct from the apparatus 12 or integrated together with the client device. The query string 20 can be a request for a prefix search to be executed by the apparatus 12 that starts with the searchable character 22. The prefix search to be executed by the apparatus 12 is for identification of one or more stored data records 28, illustrated in FIG. 2, within the distributed hash table storage system 18.

As illustrated in FIG. 1, the distributed hash table storage system 18 includes a plurality of distributed hash table nodes 24, illustrated as nodes "N0" through "N7". Each distributed hash table node 24 is implemented in a hardware-based physical machine, for example a computer server, where a given hardware-based physical machine can contain one or more of the distributed hash table nodes 24 (a distributed hash table 24 also can be implemented in a secondary physical machine that serves as a backup to a first hardware-based physical machine, in order to provide a failover mechanism in case the first hardware-based physical machine encounters a hardware failure).

Each distributed hash table node 24 can be configured for storing data records that have respective primary data record keys 30 (illustrated in FIG. 2) within a corresponding prescribed keyspace range 26 of a prescribed keyspace. In particular, a data record (e.g., 28 of FIG. 2) is stored in a distributed hash table node 24 based on a unique primary data record key 30 generated for the corresponding data record 28 (the data record also can be stored in a second distributed hash table node 24 that can serve as an alternate storage "backup" to the distirbuted hash table node 24 that stores the data record 28 based on the primary data record key 30). As illustrated in FIG. 1, the distributed hash table node "N0" 24 owns the prescribed keyspace range "0000" to "1FFF" (hexadecimal) 26, such that any data record 28 having a primary data record key 30 within the prescribed keyspace range "0000" to "1FFF" 26 is stored in the distributed hash table node "N0" 26. Similarly, the distributed hash table node "N1" 24 owns the prescribed keyspace range "2000" to "3FFF" 26; the distributed hash table node "N2" 24 owns the prescribed keyspace range "4000" to "5FFF" 26; the distributed hash table node "N3" 24 owns the prescribed keyspace range "6000" to "7FFF" 26; the distributed hash table node "N4" 24 owns the prescribed keyspace range "8000" to "9FFF" 26; the distributed hash table node "N5" 24 owns the prescribed keyspace range "A000" to "BFFF" 26; the distributed hash table node "N6" 24 owns the prescribed keyspace range "C000" to "DFFF" 26; and the distributed hash table node "N7" 24 owns the prescribed keyspace range "E000" to "FFFF" 26. The number of distributed hash table nodes 24 and the associated keyspace ranges 26 are illustrative only, as fewer or more distributed hash table nodes 24 can be utilized, with equal or unequal keyspace ranges 26 assigned to the distributed hash table nodes 24.

Figure 2:
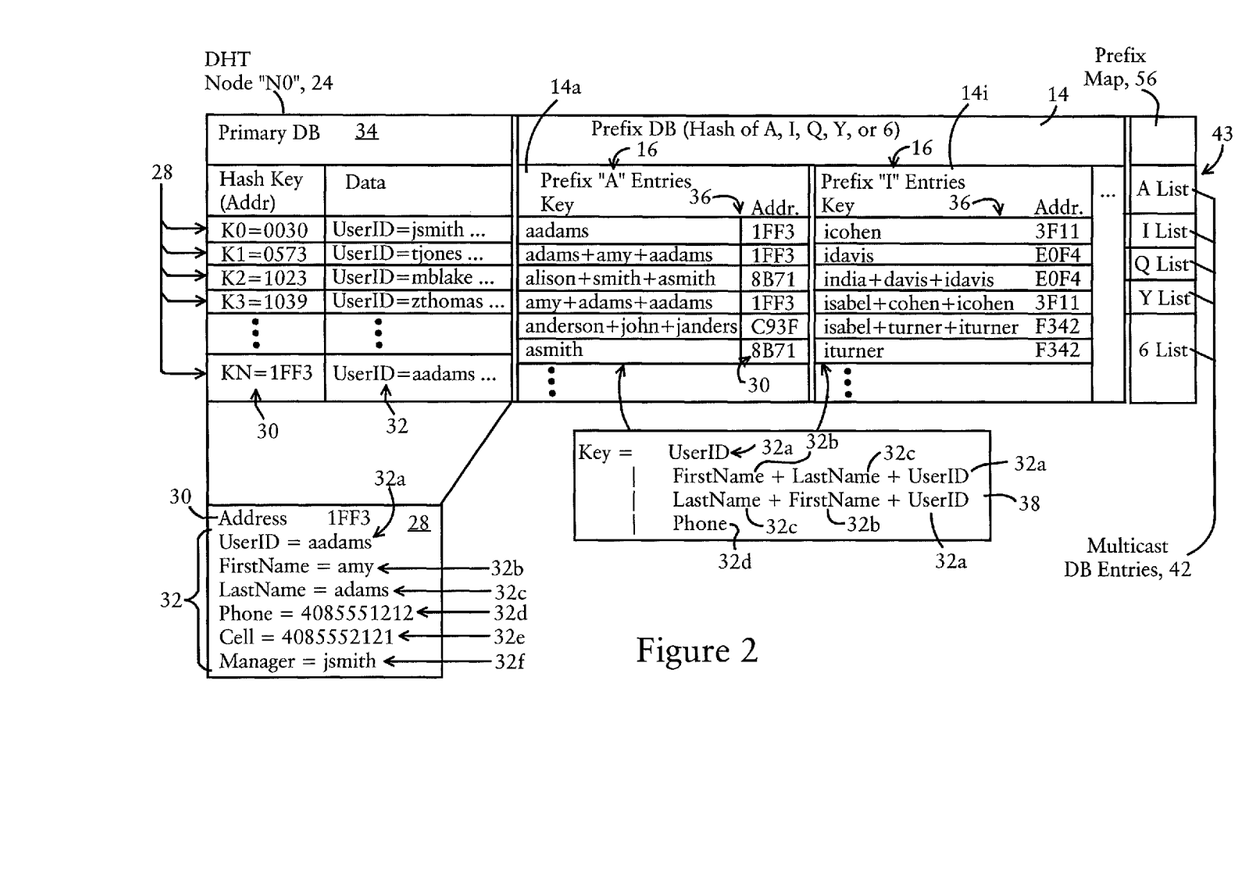
FIG. 2 illustrates one of the distributed hash table nodes of FIG. 1, according to an example embodiment.

FIG. 2 illustrates one of the distributed hash table nodes 24 of FIG. 1, according to an example embodiment. Each distributed hash table node (e.g., "N0") 24 can comprise a primary database 34, a prefix database 14 comprising zero or more prefix group entries 36, a multicast database 43 with zero or more multicast database entries 42, and a prefix map table 56, described below.

As illustrated in FIG. 2, a given data record 28 stored in the primary database 34 can include data fields 32: the primary data record key 30 can be generated based on performing a prescribed hash operation on a prescribed field 32a in the data record 28 that has a unique value among all other data records 28; the resulting hash value 30 (illustrated as "1FF3" for the prescribed filed 32a having the value "aadams") results in a unique value for the corresponding data record 28 and that can be used as an index (e.g., an address) into the prescribed keyspace of the distributed hash table storage system 18. Although FIG. 2 illustrates the primary data record key 30 stored together with the data fields 32 within the corresponding data record 28, the corresponding primary data record key 30 can be stored distinct from the data fields 32 or the data record 28, if preferred.

Hence, the generation of the primary data record key 30 based on performing a prescribed hash operation on the prescribed data field 32a having a unique value among the other data records enables use of the primary data record key 30 as a primary index for storage or retrieval of the corresponding data record 28 in the distributed hash table storage system 18.

According to the example embodiment, each distributed hash table node 24 also can include zero or more prefix groups 14 that are assigned to the distributed hash table node 24. Each prefix group (i.e., secondary database) 14 is configured for storing all secondary indexes 36 (illustrated in FIG. 2) that start with a corresponding assigned searchable character symbol 16.

As illustrated in FIG. 1, the distributed hash table node "N0" 24 is assigned the prefix groups 14 associated with the respective searchable (alphanumeric) character symbols "A", "I", "Q", "Y", and "6" 16; the distributed hash table node "N1" 24 is assigned the prefix groups 14 associated with the respective searchable character symbols "B", "J", "R", "Z", and "7" 16; the distributed hash table node "N2" 24 is assigned the prefix groups 14 associated with the respective searchable character symbols "C", "K", "S", "0", and "8" 16; the distributed hash table node "N3" 24 is assigned the prefix groups 14 associated with the respective searchable character symbols "D", "L", "T", "1", and "9" 16; the distributed hash table node "N4" 24 is assigned the prefix groups 14 associated with the respective searchable character symbols "E", "M", "U", and "2" 16; the distributed hash table node "N5" 24 is assigned the prefix groups 14 associated with the respective searchable character symbols "F", "N", "V", and "3" 16; the distributed hash table node "N6" 24 is assigned the prefix groups 14 associated with the respective searchable character symbols "G", "O", "W", and "4" 16; and the distributed hash table node "N7" 24 is assigned the prefix groups 14 associated with the respective searchable character symbols "H", "P", "X", and "5" 16. The assignment of the searchable character symbols 16 (and the respective prefix groups 14) to a given distributed hash table node 24 is illustrative only; further, the assignment may be based on hashing the corresponding searchable character symbol 16.

Each prefix group 14 is configured for storing all secondary indexes 36 in the form of prefix entries 36 comprising a secondary index key 38 used for searching the corresponding data record 28, and the corresponding primary data record key 30 for use as an address for locating the corresponding record 28 within the distributed hash table storage system 18. Each secondary index key 38 stored within a prefix group 14 starts with the same searchable character symbol 16 assigned to the corresponding prefix group 14. As illustrated in FIG. 2, the prefix group 14*a* is assigned the searchable character symbol "a" 16 (consisting of the single searchable character "a"); hence, each of the secondary index keys 38 stored within the respective prefix entries 36 of the prefix group 14*a* start with the same searchable character symbol "a" 16 assigned to the prefix group 14*a*. Similarly, the prefix group 14*i* is assigned the searchable character symbol "i" 16 (consisting of a single searchable character "i"); hence, each of the secondary index keys 38 stored within the respective prefix entries 36 of the prefix group 14*i* start with the same searchable character symbol "i" 16 assigned to the prefix group 14*i*.

As illustrated in FIG. 2, a secondary index key 38 can be formed based solely using a prescribed field (e.g., 32*a*, 32*d*, or 32*e*) that has a unique value among the data records 28; alternately, a secondary index key 38 can be formed from one field 32 in the corresponding data record 28 concatenated with zero or more additional fields in the one data record; depending on implementation of the prefix database 14, at least a portion of each secondary index key 38 can have an (optional) unique value among the data records. FIG. 2 illustrates the character "+" as a delimiter between the concatenated strings, the delimiter representing a white space (i.e., the "+" in FIG. 2 represents a white space, and does not represent a plus symbol). Hence, FIG. 2 illustrates four (4) secondary index keys 38 that can be generated for a data record 28, namely based on: only the user identifier field 32*a*; the first name field 32*b* concatenated with the last name field 32*c* and the user identifier field 32*a*; the last name field 32*c* concatenated with the first name field 32*b* and the user identifier field 32*a*; and the office phone number field 32*d*.

Hence, each secondary index key 38 that starts with the searchable character symbol "a" 16 is assigned to the corresponding prefix group 14*a*, enabling all prefixes searches starting with the searchable character symbol "a" 16 to be directed to the prefix group 14*a* in the associated distributed hash table node "N0" 24. As illustrated with respect to the data record 28 specifying the value "aadams" in the user identifier field 32*a* and having the primary data record key value "1FF3" 30, the prefix group 14*a* stores the secondary indexes 36 having the respective secondary index keys "aadams" (based on user identifier field 32*a* only), "adams+amy+aadams" (based on concatenating the last name field 32*c* with the first name field 32*b* and the user identifier field 32*a*), and "amy+adams+aadams" (based on concatenating the first name field 32*b* with the last name field 32*c* and the user identifier field 32*a*) 38, each of the entries specifying the same primary data record key value "1FF3" 30.

Hence, in response to receiving the prefix search query 20 using the searchable character symbol "a" 22, the apparatus 12 of FIG. 1 can identify the searchable character "a" 22 in the query 20 as assigned to the prefix group 14*a* in the distributed hash table node "N0", and send to the prefix group 14*a* in the distributed hash table node "N0" 26 a prefix search request 40 specifying the query search string starting with the searchable character symbol "a" 22, for retrieval of the prefix entries 36 having the secondary indexes starting with the query string 22. As described in further detail below, each prefix group 14 can be configured for performing a sequential search through its prefix entries 36 to identify and return a list of the secondary indexes 36 matching the query string 22 specified in the prefix search request 40, for example using the commercially available Berkeley database (BDB). In addition, each prefix group 14 can be associated with a multicast database entry 42 in a multicast database 43: the multicast database entry (e.g., "A List") 42 can be implemented in the form of a a subscriber list 42 that enables the prefix group 14 to generate an alert for network nodes identified in the subscriber list 42 in response to any change in the secondary indexes 36 stored in the corresponding prefix group 14.

Hence, the processor circuit 46 of the apparatus 12 of FIG. 1 also can be configured for sending a subscribe request 50 to a prefix group 14 for storage in the corresponding subscriber list 42, enabling the prefix group 14 to identify any changes in the secondary indexes 36 that would require the processor circuit 46 to update the corresponding cache of prefix search results stored in the memory circuit 48.

Although not illustrated in FIG. 1, each of the distributed hash table nodes 24 also include an interface circuit (e.g., a network interface circuit (NIC) 44*b*), the processor circuit 46, and a memory circuit 48.

Any of the disclosed circuits of the apparatus 12 or any of the DHT nodes 24 (including the client device interface circuit 44*a*, the network interface circuit 44*b*, the processor circuit 46, the memory circuit 48, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 48) causes the integrated circuit(s) implementing the processor circuit 46 to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 48 can be implemented, for example, using a non-transitory non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a tangible memory medium in the disclosed apparatus (e.g., in a receive buffer). Also note that the memory circuit 23 can be implemented dynamically by the processor circuit 46, for example based on memory address assignment and partitioning executed by the processor circuit 46.

Figure 3:
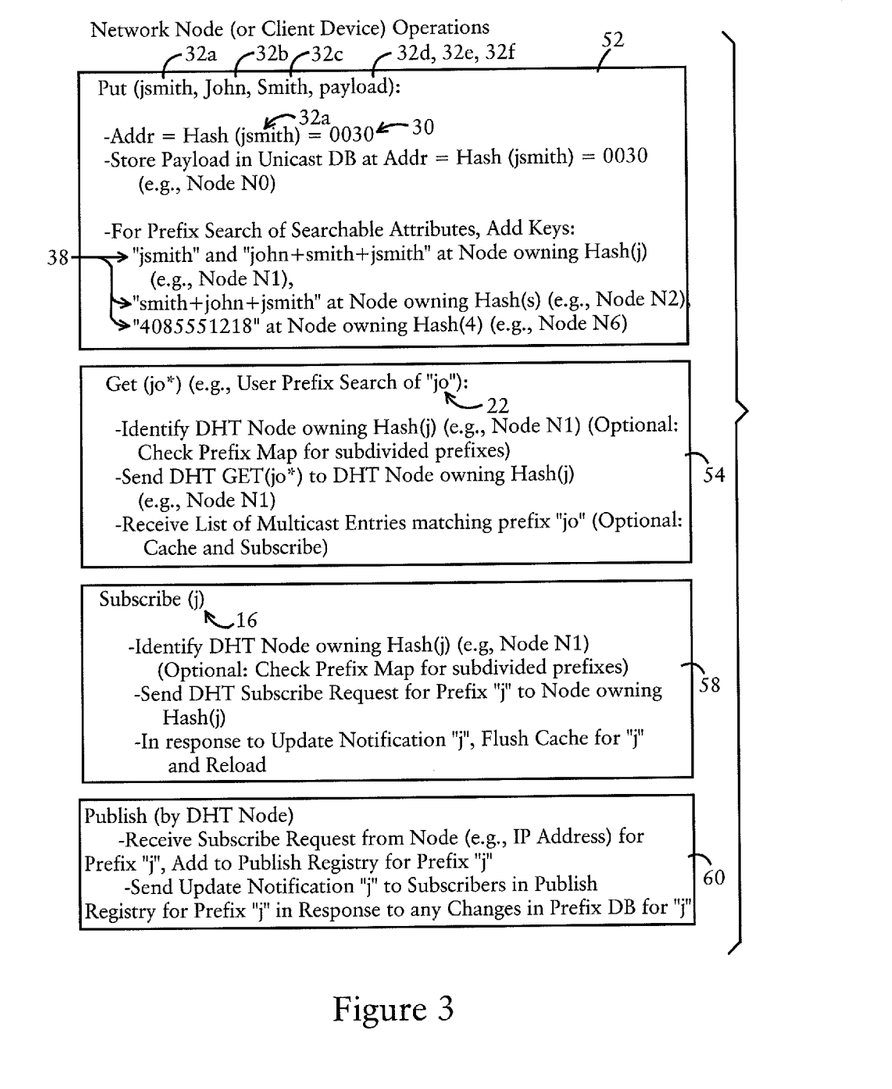
FIG. 3 illustrates example operations executed in the distributed hash table storage system by the network node and/or one of the distributed hash table nodes of FIG. 1, according to an example embodiment.

FIG. 3 illustrates example operations executed in the distributed hash table storage system by the apparatus 12 and/or one of the distributed hash table nodes 24 of FIG. 1, according to an example embodiment. The processor circuit 48 of the apparatus 12 can execute a put operation 52, for storage of a data record 28 in the primary database 34 of one of the DHT nodes 26 based on the corresponding primary data record key 30, and generation and storage of secondary indexes 36 containing the respective secondary index keys 38 in the prefix group 14 corresponding to the starting searchable character symbol 16, e.g., all secondary index keys 38 starting with the searchable character symbol "j" 16 are stored with the corresponding primary data record key 30 at the DHT node "N1" 24, all secondary index keys 38 starting with the searchable character symbol "s" 16 are stored with the corresponding primary data record key 30 at the DHT node "N2" 24, and all secondary index keys 38 starting with the searchable character symbol "4" 16 are stored with the corresponding primary data record key 30 at the DHT node "N6" 24.

The processor circuit 48 of the apparatus 12 also can execute a get operation 54, for example outputting a prefix search request 40 based on receiving a query string "jo" 22 from the client device 21. The processor circuit 48 can identify a DHT node 24 that owns the prefix group 14 for the starting searchable character symbol "j" 16, for example based on performing a hash of the searchable character symbol (if hash based mapping is used for the searchable character symbols), and identifying the DHT node (e.g., "N1") 24 containing the prefix group 14 for the searchable character symbol "j" 16. As described in detail with respect to FIGS. 4 and 5, the apparatus 12 can execute the assignment of prefix groups to each of the DHT nodes 24, and store the associations between searchable character symbols 16, the prefix groups 14, and DHT nodes 24 in a prefix map table 56 that can be stored in the network-based DHT storage system 18 (e.g., in each DHT node 24 as illustrated in FIG. 2) and/or locally in the memory circuit 48 as illustrated in FIG. 1. The processor circuit 46 of the apparatus 12 also can retrieve from a storage a data record 28 based on receiving the corresponding primary data record key 30, for example in response to a search result from one of the prefix groups 14.

The processor circuit 46 in the apparatus 12 also can execute a subscribe operation 58, in which the apparatus 12 sends a subscribe request 50 to a prefix group 14 for generation of an alert to notify the apparatus 12 of any changes in the secondary indexes 36 stored in the corresponding prefix group 14: the subscribe request 50 causes the destination prefix group 14 to execute a publish operation 60 its subscriber list 42 in order to identify the apparatus 12 as requiring an alert in response to any change in the secondary indexes 36 that start with the corresponding searchable character symbol 16. Hence, the network node 12 can receive an alert to update its cache of prefix search results for a corresponding searchable character symbol 16.

Figure 4:
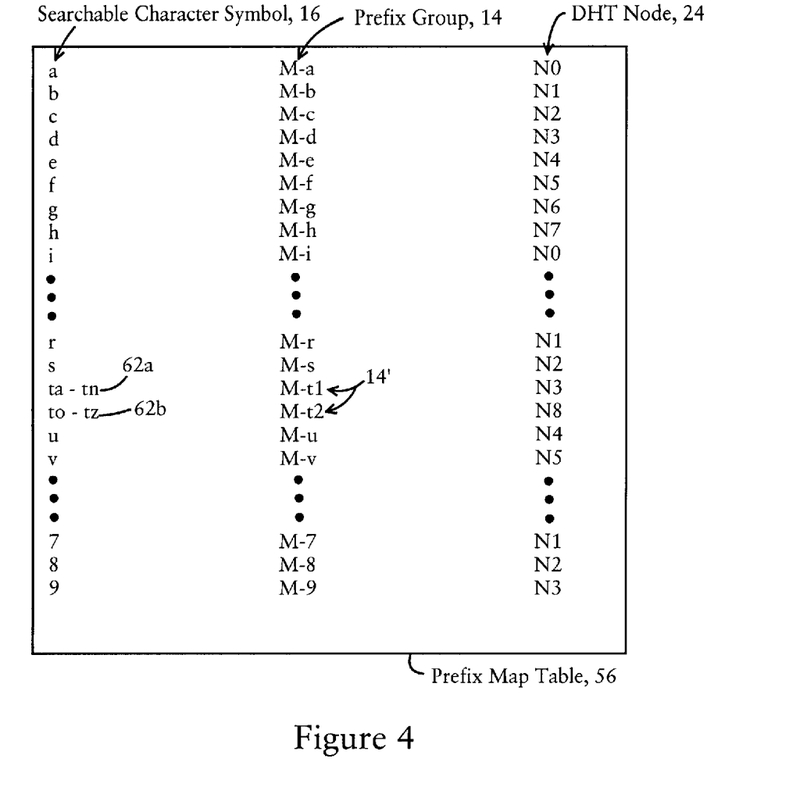
FIG. 4 illustrates in further detail the prefix map table of FIG. 1, according to an example embodiment.

FIG. 4 illustrates in further detail the prefix map table of FIG. 1, according to an example embodiment. The prefix map table 56, which can be stored in the DHT nodes 24 of the DHT storage system 18 and/or the memory circuit 48 of the apparatus 12, can specify the searchable character symbol 16 that is assigned to a corresponding prefix group 14; the prefix map table 56 also can specify the location of the prefix group 14 within the DHT storage system 18, namely based on identifying the DHT node 24 that contains the assigned prefix group 14. In particular, FIG. 4 illustrates that a searchable character symbol (or symbol group comprising two or more searchable characters) 16 is assigned (e.g., dynamically mapped) to a prescribed prefix group 14: the references to the prefix groups (e.g., "M-a") are arbitrary references that merely illustrate the association between the searchable character symbol 16 and the associated prefix group; hence, the prefix map table 56 can provide an implicit mapping between a searchable character symbol and the assigned prefix group 14, without the necessity of an explicit reference to the assigned prefix group 14.

The corresponding DHT node 24 that contains the appropriate prefix group 14 can be identified in the prefix map table 56 based on executing a hash operation on the identifier of the associated prefix group 14. For example, assuming the searchable character symbol 16 is "b", any apparatus can identify from the prefix map table 56 that the searchable character symbol "b" maps to the prefix group having the example label "M-b": the corresponding destination DHT node 24 is identified based on executing a hash operation on the label "M-b", resulting in a hashed value that is within a hash value range owned by the DHT node "N1". Although not shown in FIG. 4, the prefix map table 56 also can store the hash value ranges associated with each of the DHT nodes 24.

As described previously, the term "assignment" as used in this specification and the attached claims does not refer to a permanent association or mapping, or a predetermined association/mapping, between any two entities; to the contrary, the term "assignment" refers to an association or mapping that can be established (or changed) dynamically in response to a detected condition. Hence, a prefix group 14 can be dynamically split based on a detected condition, for example detecting that the prefix group 14 exceeds a desired size.

As illustrated in FIG. 4, a prefix group for the searchable character symbol "t" 16 can be split by the processor circuit 46 into first and second prefix subgroups 14' based on the processor circuit 46 assigning a first range "ta-tn" (i.e., all two-character symbols between and including "ta" and "tn") 62a of the searchable character symbol "t" 16 to the first prefix subgroup "M-t1" 14', the processor circuit 46 assigning a second range "tn-tz" 62b of the searchable character symbol "t" 16 to the second prefix subgroup "M-t2" 14', and the processor circuit 46 migrating (i.e., automatically moving) the second prefix subgroup "M-t2" 14' (and the associated secondary indexes within the corresponding second range "tn-tz" 62b to a different distributed hash table node "N8" 24 that can be newly added to the DHT storage system 18 (not shown in FIG. 1) for increased capacity. Hence, the prefix map table 56 can be updated by the processor circuit 46 to identify the first prefix subgroup "M-t1" 14' in the DHT node "N3" 24 for searching the first range "ta-tn" 62a of the searchable character symbol "t" 16, and to identify the second prefix group "M-t2" in the DHT node "N8" for searching the second range "tn-tz" 62b of the searchable character symbol "t" 16.

Although not illustrated in FIG. 4, the prefix map table 56 also can store the prescribed keyspace ranges 26 and the associated DHT nodes 26, in order to identify a DHT node 24 for storage or retrieval of a data record 28 based on the corresponding primary data record key 30.

Figure 5:
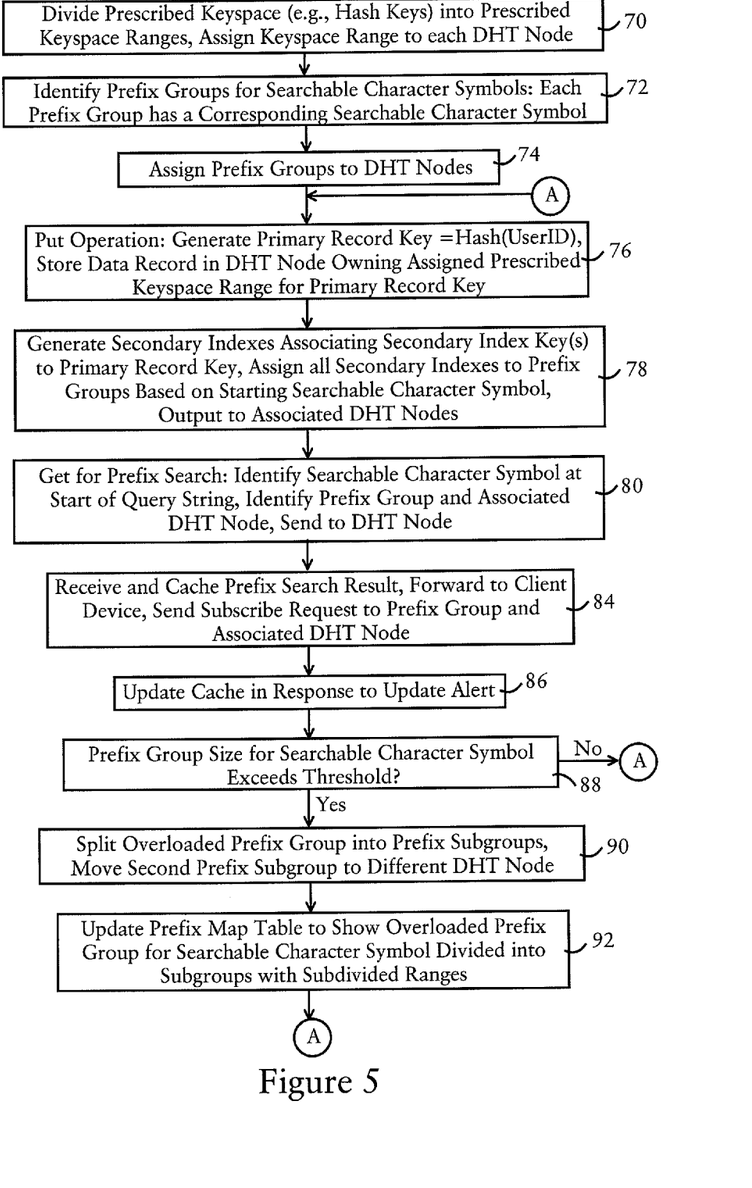
FIG. 5 illustrates an example method by the network node of FIG. 1, according to an example embodiment.

FIG. 5 illustrates an example method by the network node of FIG. 1, according to an example embodiment. The steps described in FIG. 5 can be implemented as executable code stored on a computer or machine readable non-transitory tangible storage medium (e.g., floppy disk, hard disk, ROM, EEPROM, nonvolatile RAM, CD-ROM, etc.) that are completed based on execution of the code by a processor circuit implemented using one or more integrated circuits; the steps described herein also can be implemented as executable logic that is encoded in one or more non-transitory tangible media for execution (e.g., programmable logic arrays or devices, field programmable gate arrays, programmable array logic, application specific integrated circuits, etc.).

The processor circuit 46 in the apparatus 12 of FIG. 1 can be configured for establishing the distributed hash table storage system 18 in step 70 based on dividing a prescribed keyspace (defined according to a prescribed hash function) into prescribed keyspace ranges 26, as illustrated in FIG. 1, and assigning the keyspace range 26 to each corresponding DHT node 24 as illustrated in FIG. 1. As apparent from the foregoing, each of the keyspace ranges 26 are mutually exclusive, hence no two DHT nodes 24 can have overlapping keyspace ranges 26, otherwise a conflict in storage of the data records would result.

The processor circuit 46 utilizes an interface circuit 44 in order to identify the prefix groups 14 for the respective searchable character symbols 16 in step 72. For example, the interface circuit 44 (e.g., 44a) can identify in step 72 the prefix groups based on providing access to the prefix map table 56, enabling the processor circuit 46 to assign and write in step 74 the prefix map 56 into the memory circuit 48, for subsequent identification of the prefix groups 14 for the respective searchable character symbols 16: as illustrated in FIG. 4, the processor circuit assigns in step 74 at least one of the prefix groups 14 to each distributed hash table node 24 in the network-based DHT storage system 18. Hence, each DHT node 24 can contain zero or more prefix groups 14 for a corresponding searchable character symbol 16. Alternately, the processor circuit 46 can utilize the interface circuit 44a to access the prefix map table 56 stored in the local memory circuit 48 in order to identify the prefix groups 14 that are associated with the character symbols 16, for example based on executing a put operation 52, a get operation 54, and/or a subscribe operation 58. Alternately, the processor circuit 46 can utilize the network interface circuit 44b to access the prefix map table 56 stored in the network-based DHT storage system 18.

The processor circuit 46 can execute in step 76 a put operation 52 as described above with respect to FIGS. 2 and 3, including generating a primary record key 30 based on hashing a prescribed field 32a in the data record 28 that has a unique value among the data records, and sending the data record 28 for storage in the DHT 24 having the corresponding prescribed keyspace range 26.

The processor circuit 46 also executes in step 78, as part of the put operation 52, generation of the secondary indexes 36 that associate the secondary index keys 38 to the primary record key 30: each of the secondary indexes 36 are assigned to the appropriate prefix group 14 based on the starting searchable character symbol 16 of the corresponding secondary index key 38. Hence, as described previously with respect to FIGS. 2 and 3, all the secondary index keys 38 starting with the searchable character symbol "a" 16 are stored with their associated primary data record keys 30 within the prefix group "M-a" 14a in the DHT node "N0" 24; all the secondary index keys 38 starting with the searchable character symbol "i" 16 are stored with their associated primary data record keys 30 within the prefix group "M-i" 14i also in the DHT node "N0" 24, etc. As described previously with respect to FIG. 2, numerous secondary index keys can be generated for a single data record 28, based on utilizing one or more fields 32 of the data record 28.

The processor circuit 46 also executes in step 80 the get operation 54 for a prefix search based on identifying at least a first searchable character of a query string 22, although the first two searchable characters of the query string 22 may be utilized, especially for prefix subgroups 14' that are divided into ranges 62 of searchable character symbols. Hence, the searchable character symbol is identified from the query string 22 has a "matching searchable character symbol", and the appropriate prefix group 14 (or prefix subgroup 14') can be identified, for example from the prefix map table 56, enabling the processor circuit 46 to send in step 80 the prefix search request 40 with the query string 22 to the identified destination prefix group 14 associated with the corresponding matching searchable character symbol from the query string 22.

The destination DHT node 24, in response to receiving the prefix search request 40, can forward the prefix search request 42 to the appropriate prefix group 14 based on the matching searchable character symbol located at the beginning of the query string 22: as described previously with respect to FIG. 4, the destination DHT node 24 can identify the appropriate prefix group 14 from a local (or remote) prefix map table 56; hence, any DHT node 24 can arbitrarily receive any prefix search request 40, and forward if necessary the DHT request 40 to the appropriate destination DHT node (alternately, hashing of the searchable character symbol may be employed to eliminate the necessity of the DHT node 24 performing any parsing of the query string 22). The prefix group 14 can execute a sequential search of its prefix entries 36 to identify those entries 36 matching the query string in the prefix search, and return the query results 82 containing the matching entries for delivery to the apparatus 12.

In response to the apparatus 12 receiving the query results 82, the processor circuit 46 in step can forward the query results 82 to the client device 21, and cache the prefix search results 82 in its memory circuit 48. As described previously, the processor circuit 46 also can execute the subscribe operation 58 in step 84 based on sending a subscribe request for the corresponding searchable character symbol 16 to the appropriate prefix group 14 located within the associated DHT node 24, causing the prefix group 14 to update its subscriber list 42.

In response to the prefix group 14 detecting a change in its prefix entries 36 (e.g., an added entry 36 and/or a deleted entry 36), the prefix group 14 can send an alert message to each of the network nodes specified in its associated subscriber list 42, enabling the processor circuit 46 of the apparatus 12 to update in step 86 its cache for the corresponding searchable character symbol 16.

According to the example embodiments, searching efficiency is optimized in a distributed hash table storage system 18 based on assigning a prefix group to a corresponding searchable character symbol, and assigning at least one of the prefix groups 14 to distributed hash table nodes 24 in the network 18, such that each distributed hash table node 24 contains at least one of the prefix groups 14. Hence, each distributed hash table node 24 can store a primary database 34 of data records within a prescribed keyspace range 26, along with secondary indices 36 that start with the searchable character symbols 16 and associated with the assigned prefix groups 14.

The processor circuit 46 also can rebalance in step 88 any prefix groups 14 that exceed a prescribed size threshold, for example in the case of secondary indexes 36 that start with a relatively popular searchable character symbol (e.g., "a" or "t"), as opposed secondary indexes 36 that start with a rarely-used character symbol (e.g., "q" or "x"). As described previously with respect to FIG. 4, the processor circuit 46 can split in step 90 a prefix group 14 having a corresponding searchable character symbol (e.g., "t") 16 into first and second prefix subgroups "M-t1" 14' and "M-t2" 14' based on assigning the first range 62a to the first prefix subgroup "M-t1" 14' and the second range 62b to the second prefix subgroup "M-t2" 14'. The processor circuit 46 also can migrate in step 90 the second prefix subgroup "M-t2" 14', and the associated secondary indexes 36, to a different distributed hash table node (e.g., "N8") 24. The processor circuit 46 also can update in step 92 the prefix map table 56 to reflect the overloaded prefix group 14 for the searchable character symbol "t" 16 divided into the subgroups 14' with the subdivided ranges 62, enabling any other network node to identify the rebalancing of the prefix groups 14.

According to example embodiments, prefix search is can be implemented efficiently in a distributed hash table storage system 18. Moreover, changes to the distributed hash table storage system 18 can be readily executed in a scalable manner based on providing rebalancing of prefix groups into prefix subgroups, as hardware capacity (e.g., additional storage nodes) are added to the distributed storage system.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
    identifying a plurality of prefix groups for respective searchable character symbols, each prefix group having a corresponding searchable character symbol comprising at least one searchable character, wherein each searchable character is a unicode character;
    assigning each prefix group to one of a plurality of distributed hash table nodes in a network, each distributed hash table node containing at least one of the prefix groups, each distributed hash table node assigned a corresponding prescribed keyspace range of a prescribed keyspace, each distributed hash table node configured for storing data records having respective primary data record keys within the corresponding prescribed keyspace range of the prescribed keyspace, each data record associated with at least one secondary index associating the corresponding primary data record key with one or more searchable characters in the data record; and
    assigning the secondary indexes that start with one of the searchable character symbols to the corresponding prefix group in the associated distributed hash table node, enabling any prefix search starting with the one searchable character symbol to be directed to the corresponding prefix group in the associated distributed hash table node.

2. The method of claim 1, further comprising generating the primary data record key for one of the data records based on performing a prescribed hash operation on a prescribed field in the data record having a unique value among the data records, and executing one of sending for storage or retrieving from storage the one data record to or from the corresponding distributed hash table node assigned the corresponding prescribed keyspace range associated with the generated primary data record key.

3. The method of claim 1, further comprising generating one of the secondary indexes for a corresponding one of the data records based on generating a secondary index key from one field in the one data record concatenated with zero or more additional fields in the one data record, at least a portion of each secondary index key having a unique value among the data records.

4. The method of claim 3, further comprising outputting, to the one prefix group associated with the one searchable character symbol, the one secondary index as a prefix entry comprising the secondary index key for the corresponding one data record and starting with the one searchable character symbol, and the corresponding primary data record key for the corresponding one data record.

5. The method of claim 4, further comprising:
    generating a second of the secondary indexes for the one data record based on generating a second secondary index key from at least a second field in the one data record; and
    outputting, to a second one of the prefix groups assigned a second corresponding searchable character symbol, the second of the secondary indexes for the corresponding data record for storage as a prefix entry comprising the second secondary index key for the corresponding one data record and starting with the second searchable character symbol, and the corresponding primary data record key for the corresponding one data record.

6. The method of claim 1, further comprising sending to the one prefix group a prefix search request having a query string starting with the corresponding one searchable character symbol, for retrieval of prefix entries having the secondary indexes starting with the query string from the prefix group in the associated distributed hash table node.

7. The method of claim 1, further comprising a network node sending a subscribe request to the one prefix group for generation of an alert to notify the network node of any changes in the secondary indexes stored in the one prefix group, the alert enabling the network node to update a cache of prefix search results starting with the corresponding one searchable character symbol.

8. The method of claim 7, wherein the subscribe request causes the one prefix group to update a subscriber list for the corresponding one searchable character symbol to identify the network node for generation of the alert in response to any change in the secondary indexes starting with the corresponding one searchable character symbol.

9. The method of claim 1, further comprising generating a prefix request based on:
identifying a matching searchable character symbol from a query string;
identifying from a prefix map table an identified one of the prefix groups assigned the matching searchable character symbol, the matching searchable character symbol comprising at least two searchable characters; and
sending, to the identified one prefix group in the associated distributed hash table node, the query string for generation of a prefix search starting with the matching searchable character symbol.

10. The method of claim 1, further comprising:
determining that an identified one of the prefix groups has a number of stored secondary indexes that exceed a prescribed threshold;
splitting the identified prefix group, having the corresponding identified searchable character symbol, into first and second prefix subgroups based on assigning a first range of the identified searchable character symbol to the first prefix subgroup and a second range of the identified searchable character symbol to the second prefix subgroup, the first range distinct from the second range;
migrating the second prefix subgroup, and the associated secondary indexes within the corresponding second range of the identified searchable character symbols, to a different distributed hash table node; and
updating a prefix map to identify the first prefix subgroup for searching the first range of the identified searchable character symbols in the associated distributed hash table node, and the second prefix group for searching the second range of the identified searchable character symbols in the different distributed hash table node.

11. An apparatus comprising:
a first circuit configured for identifying a plurality of prefix groups for respective searchable character symbols, each prefix group having a corresponding searchable character symbol comprising at least one searchable character, wherein each searchable character is a unicode character; and
a processor circuit having one or more integrated circuits and configured for assigning each prefix group to one of a plurality of distributed hash table nodes in a network, each distributed hash table node containing at least one of the prefix groups, each distributed hash table node assigned a corresponding prescribed keyspace range of a prescribed keyspace, each distributed hash table node configured for storing data records having respective primary data record keys within the corresponding prescribed keyspace range of the prescribed keyspace, each data record associated with at least one secondary index associating the corresponding primary data record key with one or more searchable characters in the data record;
the processor circuit configured for assigning the secondary indexes that start with one of the searchable character symbols to the corresponding prefix group in the associated distributed hash table node, enabling any prefix search starting with the one searchable character symbol to be directed to the corresponding prefix group in the associated distributed hash table node.

12. The apparatus of claim 11, wherein the processor circuit is configured for generating the primary data record key for one of the data records based on performing a prescribed hash operation on a prescribed field in the data record having a unique value among the data records, and executing one of sending for storage or retrieving from storage the one data record to or from the corresponding distributed hash table node assigned the corresponding prescribed keyspace range associated with the generated primary data record key.

13. The apparatus of claim 11, wherein the processor circuit is configured for generating one of the secondary indexes for a corresponding one of the data records based on generating a secondary index key from one field in the one data record concatenated with zero or more additional fields in the one data record, at least a portion of each secondary index key having a unique value among the data records.

14. The apparatus of claim 13, wherein the processor circuit is configured for outputting, to the one prefix group associated with the one searchable character symbol, the one secondary index as a prefix entry comprising the secondary index key for the corresponding one data record and starting with the one searchable character symbol, and the corresponding primary data record key for the corresponding one data record.

15. The apparatus of claim 14, wherein the processor circuit is configured for:
generating a second of the secondary indexes for the one data record based on generating a second secondary index key from at least a second field in the one data record; and
outputting, to a second one of the prefix groups assigned a second corresponding searchable character symbol, the second of the secondary indexes for the corresponding data record for storage as a prefix entry comprising the second secondary index key for the corresponding one data record and starting with the second searchable character symbol, and the corresponding primary data record key for the corresponding one data record.

16. The apparatus of claim 11, wherein the processor circuit is configured for sending to the one prefix group a prefix search request having a query string starting with the corresponding one searchable character symbol, for retrieval of prefix entries having the secondary indexes starting with the query string from the prefix group in the associated distributed hash table node.

17. The apparatus of claim 11, further comprising a memory circuit configured for storing a cache of prefix search results, the processor circuit configured for sending a subscribe request to the one prefix group for generation of an alert to notify the processor circuit of any changes in the secondary indexes stored in the one prefix group, the alert enabling the processor circuit to update the cache of prefix search results starting with the corresponding one searchable character symbol.

18. The apparatus of claim 11, wherein the processor circuit is configured for generating a prefix request based on:
identifying a matching searchable character symbol from a query string;
identifying from a prefix map table an identified one of the prefix groups assigned the matching searchable character symbol, the matching searchable character symbol comprising at least two searchable characters; and
sending, to the identified one prefix group in the associated distributed hash table node, the query string for generation of a prefix search starting with the matching searchable character symbol.

19. The apparatus of claim 11, wherein the processor circuit is configured for:
determining that an identified one of the prefix groups has a number of stored secondary indexes that exceed a prescribed threshold;

splitting the identified prefix group, having the corresponding identified searchable character symbol, into first and second prefix subgroups based on assigning a first range of the identified searchable character symbol to the first prefix subgroup and a second range of the identified searchable character symbol to the second prefix subgroup, the first range distinct from the second range;

migrating the second prefix subgroup, and the associated secondary indexes within the corresponding second range of the identified searchable character symbols, to a different distributed hash table node; and updating a prefix map to identify the first prefix subgroup for searching the first range of the identified searchable character symbols in the associated distributed hash table node, and the second prefix group for searching the second range of the identified searchable character symbols in the different distributed hash table node.

20. Logic encoded in one or more non-transitory tangible media for execution and when executed operable for:

identifying a plurality of prefix groups for respective searchable character symbols, each prefix group having a corresponding searchable character symbol comprising at least one searchable character, wherein each searchable character is a unicode character;

assigning each prefix group to one of a plurality of distributed hash table nodes in a network, each distributed hash table node containing at least one of the prefix groups, each distributed hash table node assigned a corresponding prescribed keyspace range of a prescribed keyspace, each distributed hash table node configured for storing data records having respective primary data record keys within the corresponding prescribed keyspace range of the prescribed keyspace, each data record associated with at least one secondary index associating the corresponding primary data record key with one or more searchable characters in the data record; and assigning the secondary indexes that start with one of the searchable character symbols to the corresponding prefix group in the associated distributed hash table node, enabling any prefix search starting with the one searchable character symbol to be directed to the corresponding prefix group in the associated distributed hash table node.

* * * * *